United States Patent [19]

Van Helden et al.

[11] Patent Number: 5,115,002
[45] Date of Patent: May 19, 1992

[54] STABILIZED COPOLYMER COMPOSITIONS

[75] Inventors: Arend K. Van Helden; Jean-Pierre Gilson, both of Amsterdam; Johannes L. M. Syrier, The Hague, all of Netherlands

[73] Assignee: Shell Oil Company, Houston, Tex.

[21] Appl. No.: 751,476

[22] Filed: Aug. 29, 1991

[30] Foreign Application Priority Data

Nov. 8, 1990 [GB] United Kingdom ............... 9024278

[51] Int. Cl.$^5$ .................... C08K 5/3495; C08K 3/34; C08K 3/38
[52] U.S. Cl. .................................... 524/91; 524/338; 524/405; 524/444; 524/450
[58] Field of Search ............... 524/405, 444, 450, 91, 524/338

[56] References Cited

U.S. PATENT DOCUMENTS

| | | | |
|---|---|---|---|
| 3,929,727 | 12/1975 | Russell et al. | 524/338 |
| 4,024,104 | 5/1977 | Russell et al. | 524/91 |
| 4,250,081 | 2/1981 | Bode et al. | 524/450 |
| 4,391,922 | 7/1983 | Harrell | 521/89 |
| 4,420,582 | 12/1983 | Canard et al. | 524/450 |
| 4,434,253 | 2/1984 | Rhys-Sikora | 521/134 |
| 4,489,193 | 12/1984 | Goswami | 525/185 |
| 4,593,061 | 6/1986 | Vogdes et al. | 524/450 |

FOREIGN PATENT DOCUMENTS

| | | |
|---|---|---|
| 0213671 | 3/1987 | European Pat. Off. . |
| 0289077 | 11/1988 | European Pat. Off. . |
| 0326224 | 8/1989 | European Pat. Off. . |
| 62-32144 | 2/1987 | Japan . |
| 62-70432 | 3/1987 | Japan . |

*Primary Examiner*—Veronica P. Hoke
*Attorney, Agent, or Firm*—James O. Okorafor

[57] ABSTRACT

A copolymer compositions comprising a major amount of an alternating copolymer of carbon monoxide with one or more olefinically unsaturated compounds and a minor of at least one stabilizing additive which is a zeolite-type trivalent-metal silicate containing a cation of an element of Group 2 of the Periodic Table is disclosed. This copolymer composition has and exhibits improved stability and contains a substantially reduced amount of residual solvent. Also disclosed is a process for producing this copolymer composition, and articles of manufacture made from this composition.

20 Claims, No Drawings

STABILIZED COPOLYMER COMPOSITIONS

BACKGROUND OF THE INVENTION

This invention relates to copolymer compositions comprising a major amount of an alternating copolymer of carbon monoxide with one or more olefinically unsaturated compounds and a minor amount of at least one stabilizing additive.

The relevant copolymers are linear and they are characterised by having a repeating structure [A—CO] which implies that a unit A is positioned left and right in between carbonyl units. A is a unit derived from an olefinically unsaturated compound. The term "copolymer" includes terpolymers in which different units A are present. Thus, the copolymers are copolymers of carbon monoxide and one or more olefinically unsaturated compounds. Examples of suitable olefinically unsaturated compounds yielding a unit A are ethene, propene, butene, octene, styrene and acrylate esters. The copolymers mentioned above are known and are disclosed in EP-A-121965 and EP-A-181014. Whilst these copolymers have attractive physical and mechanical properties such as yield stress, tensile strength, impact strength and flexural modulus, in some instances, their processing properties may leave room for improvement.

Copolymers with a high intrinsic viscosity, or limiting viscosity number (LVN), have better physical properties as engineering thermoplastic than copolymers with a lower intrinsic viscosity. Melt processing, e.g. extrusion, of copolymers, especially when they have an LVN of above about 2.0 dl/g (measured at 60° C. in m-cresol), is adversely affected by a poor melt stability which is apparent from a notable increase of the viscosity of the melt with increasing residence time. In particular in fibre and sheet applications, melt-extrusion is a critical step, even for copolymers with a low LVN. It is evident that this problem of the instability of the copolymer melt needs to be solved.

Copolymer compositions comprising a major amount of an alternating copolymer of carbon monoxide with one or more olefinically unsaturated compounds and a minor amount of at least one stabilizing additive are known in the art. For example, the stabilizing additive may be an aluminium hydroxide, such as bayerite. Whilst the addition of such a material to the copolymers brings about an improvement of the stability of the melt, it appears that especially for melt processing operations in commercial production of moulded parts and extrusion at commercial scale of fibres and sheet, the melt stability could be improved even further. It is an object of the present invention to provide copolymer compositions having further improved melt stability.

It has now been found that a high degree of melt stability of the copolymers can be achieved by the addition thereto of a zeolite-type trivalent-metal silicate which contains a cation of an element of Group 2 of the Periodic Table. It is known that zeolites which contain sodium, potassium, calcium, zinc, etc. can be used in random polymers of ethene, vinyl acetate and carbon monoxide in which the amount of ketonic carbonyl groups is substantially lower than in the present copolymers, which are linear and alternating. Surprisingly, it has been found that in order to melt stabilise the linear alternating copolymers the zeolite-type trivalent-metal silicate should contain a cation of a Group 2 element, whilst zeolite-type trivalent-metal silicates which contain cations of other elements, such as sodium and potassium, appear to destabilise the copolymers.

In addition to the high degree of melt stability which can be achieved by the addition of a zeolite-type trivalent-metal silicate, melt processing of the copolymers in the presence of such a material has another unexpected benefit in that it reduces the amount of residual solvent, which may have been used in the synthesis of the copolymer and which may still be present in the copolymer, even after conventional purification. This is unexpected since the removal of residual solvent by physical means such as extrusion of the copolymer in the presence of water or steam and the application of vacuum during extrusion failed to reduce the amount of residual solvent. This finding is important when the polymer composition is to be used in the production of articles for certain packaging applications.

SUMMARY OF THE INVENTION

Accordingly, the invention relates to novel copolymer compositions comprising a major amount of an alternating copolymer of carbon monoxide with one or more olefinically unsaturated compounds and a minor amount of at least one stabilizing additive which is a zeolite-type trivalent-metal silicate containing a cation of an element of Group 2 of the Periodic Table.

The invention also relates to a process for improving the melt stability of copolymers of carbon monoxide with one or more olefinically unsaturated compounds comprising the addition thereto of a minor amount of at least one stabilizing additive which is a zeolite-type trivalent-metal silicate compound containing a cation of an element of Group 2 of the Periodic Table. In addition, the invention relates to a process for reducing the amount of residual solvent in copolymers of carbon monoxide with one or more olefinically unsaturated compounds comprising the addition thereto of a minor amount of at least one stabilizing additive which is a zeolite-type trivalent-metal silicate containing a cation of an element of Group 2 of the Periodic Table and melting the resultant mixture. Moreover, the invention relates to a process for the preparation of the compositions of the invention which comprises blending the alternating copolymer with a zeolite-type trivalent-metal silicate containing a cation of an element of Group 2 of the Periodic Table.

Finally, the invention relates to shaped articles of manufacture produced from the compositions of the invention.

DETAILED DESCRIPTION OF THE INVENTION

The present copolymer compositions comprise a major amount of an alternating copolymer of carbon monoxide with one or more olefinically unsaturated compounds and a minor amount of at least one stabilizing additive of the invention. The expression "a minor amount" as used herein means less than 50% wt based on the weight of the composition in cases where the compositions consist only of polymer and stabilizing additive. Generally it will not be necessary to employ more than a certain amount to achieve an acceptable performance. Suitably the zeolite-type trivalent-metal silicate(s) is (are) present in a quantity of up to 20% wt based on the weight of the composition. More suitably the zeolite-type trivalent-metal silicate(s) is (are) present in a quantity of from about 0.001 to about 10% wt based on the weight of the composition and especially of from about 0.005 to about 5% wt.

The stabilizing additive according to the invention is a zeolite-type trivalent-metal silicate which contains a cation of an element of Group 2 of the Periodic Table. The zeolite-type trivalent-metal silicates mentioned hereinbefore are to be understood as being materials which are trivalent-metal silicates having a definite crystalline structure within which there are a large number of small cavities which may be interconnected by a number of channels. These cavities and channels are uniform in size and the dimensions of these pores are such that they are able to accept for adsorption molecules of certain dimensions, so that these materials have also come to be known as "molecular sieves". For the sake of brevity the zeolite-type trivalent-metal silicates may hereinafter be referred to as "zeolites".

The trivalent metal preferably comprises at least one metal selected from the group consisting of aluminium, iron, gallium and boron. In particular the trivalent metal is aluminium, in which case the zeolite of the invention is an aluminosilicate.

The zeolite of the invention may be based on a mineral or on a synthetic material. Eligible zeolites which contain aluminium as the trivalent metal are, for example, faujasite, mordenite, zeolite L and zeolite A. Good results can be achieved with zeolite A and with a faujasite type zeolite, such as zeolite X.

As state hereinbefore, the zeolite of the invention contains a cation of a Group 2 element. It is known that such cations may be incorporated into the zeolite, for example, as the result of the synthesis of the zeolite in the presence of a suitable compound of the Group 2 element, or as the result of impregnation of a zeolite or as a result of the modification of a zeolite containing the cation of another element, viz. by ion exchange. A skilled person knows that when the ion exchange method is applied to a zeolite which possesses both relatively large and relatively small pores, the portion of the cations which is located in the smaller pores may not be (completely) removed, i.e. this portion of the cations is not easily exchangeable. Thus, if the zeolite of the invention is prepared by the ion exchange method it may contain a cation which is not the cation of a Group 2 element and which is not (easily) exchangeable. The presence of this cation will in general not deteriorate the performance of the zeolite as a heat stabiliser in the copolymers.

Preferably the Group 2 element is an element from Group 2A of the Periodic Table. Particularly good results can be obtained with calcium and strontium.

The molar ratio of the amounts of silicon and the trivalent metal (M) present in the zeolite is not an important parameter with respect to the stabilizing activity of the zeolites of the invention. As the amount of cations of the Group 2 element which may be present in the zeolite is related to this molar ratio it is preferred that the zeolite(s) of the invention has (have) a silicon/trivalent-metal (Si/M) molar ratio of from 1 to 10. It is more preferred that this ratio ranges from 1 to 7 and it is most preferred that this ratio ranges from 1 to 5. It is generally known that the Si/M molar ratio can be determined by the synthesis of the zeolite and that the Si/M molar ratio may also be changed after the synthesis of the zeolite. For example, the Si/M ratio may be increased by leaching with a suitable chemical such as an aqueous acid.

The amount of the cation of the element of Group 2 present in the zeolite of the invention is not important. A skilled person knows that the maximum amount of the bivalent cation of the Group 2 element which can be present is 0.5 gram atom per gram atom of the trivalent metal (M). Preferably the cation of the element of Group 2 is present in an amount of at least 0.1 gram atom per gram atom of the trivalent metal and in particular in an amount of at least 0.25 gram atom per gram atom of the trivalent metal.

The particles of the zeolites of the invention may be the particles as they are obtained in the synthesis of the zeolite or they may be obtained by milling larger particles, such as extrudates. If desirable, particles with a certain size may be selected, for example by sieving. In particular when the zeolite particles are obtained by milling, the zeolite may be contaminated with additives, such as a binder material, which may or may not have an influence on the performance of the zeolite as a melt stabiliser for the copolymers of the invention.

The particle size of the zeolites of the invention is not a critical parameter, as long as the particles are sufficiently small so that they do not disturb, for example, the melt processing of the copolymer composition. Suitably the maximum particle size of the zeolite(s) is 100 $\mu$m, whereas the average particle size preferably ranges from 0.05 $\mu$m to 10 $\mu$m, most preferably from 0.1 $\mu$m to 5 $\mu$m.

It is generally known that zeolites are able to take up ambient moisture. The zeolites can be dried, for example, by heating the zeolite in a dry atmosphere. Before blending the zeolites of the invention into the copolymers, the zeolites may be dried but they may also be used without prior drying. In the case that the zeolites have not been dried before blending and a relatively large quantity of the zeolites is blended into the copolymer, foaming of the polymer melt may occur as a consequence of the release of water from the zeolite at the applied processing temperature.

The stabilizing additives of the invention may be used alone, or they may be used in combination with one or more additional additives which may improve other properties of the compositions such as oxidative stability and UV stability. Such additional additives may be selected from the group consisting of sterically hindered phenolic compounds, aromatic amines, hydroxybenzophenones, hydroxyphenylbenzotriazoles, aluminium hydroxides, carboxylic esters of glycerol, acid amides of monocarboxylic acids, glycidyl ethers, and copolymers of ethene and acrylic acid or methacrylic acid. Some of these may be well-known additives for polymers, e.g. those marketed under the trademarks "IRGANOX", "IONOL", "TINUVIN", "CYASORB" and "NAUGARD". Suitably the hindered phenolic compounds are selected from 2,5-dialkylphenols, from esters of a straight chain alcohol and a hydroxy,dialklphenyl-substituted carboxylic acid, from 1,2-bis(acetyl)hydrazines in which the acetyl group carries a hydroxy,dialkylphenyl substituent, from N,N'-bis(acetoxyalkyl)oxalamides in which the acetyl group carries a hydroxy,dialkylphenyl substituent, and from alpha-N,omega-N-bis(acetyl)diamines in which the acetyl group carries a hydroxy,dialkylphenyl substituent. Suitable aromatic amines are selected from the group formed by the diphenylamines, such as 4,4'-bisbenzyldiphenylamines or anilino-diphenylamines, and diaminonaphthalenes, such as N,N,N',N'-tetraalkylaminonaphthalenes. Good results can be obtained when the stabilizing additives of the invention are applied in combination with a hindered phenolic compound and a copolymer of ethene and methacrylic acid.

The alternating copolymer of carbon monoxide and one or more olefinically unsaturated compounds which is part of the compositions of the invention may be obtained by copolymerising the monomers in the presence of a catalyst composition comprising a compound of a metal chosen from Group VIII of the Periodic Table. In particular the alternating copolymer may be obtained using a catalyst composition comprising a palladium compound and a bidentate or a multidentate ligand. A special bidentate or multidentate ligand is a bisphosphine or a multiphosphine. The catalyst compositions which comprise a palladium compound and a bidentate or a multidentate ligand, especially, a bisphosphine or a multiphosphine, are very active polymerisation catalysts so that the copolymers obtained may have a very low content of residual palladium. A very active polymerisation catalyst may, for example, be based on palladium acetate, 1,3-bis(diphenylphosphino)propane and trifluoroacetic acid. Preferably the copolymers have a palladium content below 100 ppm, in particular below 50 ppm, because these copolymers may have better melt stability than the copolymers which have a higher palladium content.

Many olefinically unsaturated compounds are eligible monomers in the copolymerisation with carbon monoxide in the presence of the catalyst compositions comprising a compound of a metal chosen from Group VIII of the Periodic Table which copolymerisation yields the copolymers of the invention. Typically the copolymer is a copolymer of carbon monoxide with at least one olefinically unsaturated hydrocarbon, in particular ethene or a mixture of ethene and propene. Preferred copolymers are the copolymers having an LVN of at least 1.3 dl/g, better still at least 1.6 dl/g.

The stabilizing additives may be added to the copolymer by various continuous or discontinuous processes, for example, by dry blending and tumbling. The copolymer may be used in the form of a powder, or as a granulate, which may have been obtained by a melt processing technique.

The compositions of this invention can be processed into articles of manufacture such as fibres, films, laminates, tubes, piping and articles having an intricate shape by any melt processing technique, such as melt spinning, extrusion and co-extrusion, injection moulding and compression moulding.

The stabilizing additives of this invention do not only improve the melt stability of the relevant carbon monoxide/olefin co- and terpolymers, but they also render the co- and terpolymer better processable in melt processing operations. Thus they render processable certain types of copolymers which were hardly processable before the present invention. Moreover, by melting the compositions of the invention, the zeolites decrease the residual amount of the solvent which may have been used in the synthesis of the copolymers and which may have been left in the copolymers after their purification. Thus, the zeolites render the compositions of the invention very suitable for use as base material in the production of articles for certain packaging applications. The melting to be applied in order to decrease the residual amount of the solvent may be the melting which occurs when subjecting the copolymer to a melt processing technique.

The invention is further illustrated by the following non-limiting examples.

EXAMPLE 0

Zeolites Used in the Invention

Two types of zeolites—commercially available or prepared as hereinafter described were used in conducting the experiments of this invention. The commercially available zeolites differed by their cation component. These zeolites are listed below:

(a) Zeolite Ca from Laporte Co. (UK) hereinafter sometimes referred to as A;

(b) Zeolite Na from Union Carbide Co. (USA) hereinafter sometimes referred to as X; and (c) Zeolite K from British Drug House (UK) hereinafter sometimes referred to as C.

Commercially unavailable zeolites used in this invention were prepared by an ion exhange procedure using either zeolites A, X, or C as starting material using the following procedures. To a 10 g slurry of either zeolite A, X, or C, 1 molar solution in water of either calcium chloride, barium chloride, strontium chloride or magnesium chloride was added over a period of an hour at 55° C. A zeolite now containing a Group 2 cation ($Ca^{2+}$, $Mg^{2+}$, $Ba^{2+}$ or $Sr^{2+}$) was recovered by filtration, and washed several times with dimineralized water until the washing liquid was free of chloride. This was followed by heating at 150° C. in a vacuum for 20 hours.

Table 1 indicates the particular zeolite or zeolite composition used in examples 1 to 16 which are subsequently discussed.

TABLE 1

| Example No. | Zeolite Used |
| --- | --- |
| 1-5 | A |
| 6* | X — $CaCl_2$ |
| 7-12* | C — $SrCl_2$ |
| 13* | A — $MgCl_2$ |
| 14* | A — $BaCl_2$ |
| 15 | X |
| 16 | C |

*Commercially unavailable zeolites prepared by the method disclosed in Example 0.

EXAMPLES 1-16

A granulate of a terpolymer of ethene, propene and carbon monoxide with an LVN of 1.8 dl/g (measured in m-cresol at 60° C.), a crystalline melting point of 220° C., containing 0.5% wt of 1,3,5-tris(3,5-di-t.butyl-4-hydroxyphenylmethyl)-2,4,6-trimethylbenzene (a commercially available antioxidant) and containing 0.5% wt of a copolymer of ethene and methacrylic acid (10% wt), was blended with a sample of a zeolite (average particle size about 2 μm) in a commercial torque rheometer (designed for characterisation of polyvinylchloride and equipped with two spindles) operated at 240° C. The samples were not dried immediately before blending into the copolymer. The torque was measured at a speed of 37.5 rpm and 50 rpm of the spindles. During the measurement, initial rapid changes in torque were seen as a result of melting of the copolymer and of equilibration of temperature, whereafter the torque slowly increased as a result of instability of the melt until a maximum was reached which was followed by a rapid decrease of the torque. The latter decrease of the torque is the result of mechanical disintegration of the solidified melt. The residence time until the torque maximum is given in Table 2.

EXAMPLE 17

The procedure of Examples 1-16 was substantially repeated with the difference that the addition of a zeolite to the polymer granulate was omitted. The result is presented in Table 2.

TABLE 2

| Example | Zeolite[a] | Cation | Molar ratio Si/M | Time to torque maximum (minutes) |
|---|---|---|---|---|
| 1 | A (0.03) | $Ca^{2+}$ | 2 | 220 |
| 2 | A (0.1) | $Ca^{2+}$ | 2 | 210 |
| 3 | A (0.3) | $Ca^{2+}$ | 2 | 180 |
| 4 | A | $Ca^{2+}$ | 2 | 190 |
| 5 | A (3.0) | $Ca^{2+}$ | 2 | 100 |
| 6 | X | $Ca^{2+}$ | 2 | 110 |
| 7 | A (0.01) | $Sr^{2+}$ | 2 | 155 |
| 8 | A (0.03) | $Sr^{2+}$ | 2 | 180 |
| 9 | A (0.1) | $Sr^{2+}$ | 2 | 220 |
| 10 | A (0.3) | $Sr^{2+}$ | 2 | 225 |
| 11 | A | $Sr^{2+}$ | 2 | 155 |
| 12 | A (3.0) | $Sr^{2+}$ | 2 | 170 |
| 13 | A | $Mg^{2+}$ | 2 | 80 |
| 14 | A | $Ba^{2+}$ | 2 | 140 |
| 15 | X | $Na^+$ | 2 | 55 |
| 16 | C | $K^+$ | 2 | 25 |
| 17 | None | — | — | 70 |

[a]1.0 wt % based on total weight of composition, unless otherwise indicated.

When the copolymer melt is subjected to torque measurements according to Example 1-17 the time required to reach a maximum in torque is a measure of (in)stability of the melt. When the maximum is reached after a relatively long period of time, the stability of the polymer melt is relatively high.

By comparing the result of Example 1-14 to those of Examples 15-17 it can be seen that the addition of a zeolite according to the invention brings about an increase in the copolymer's melt stability, whereas the addition of zeolites containing another cation other than a cation of a Group 2 element does not stabilise the copolymer melt. From the results of Examples 1-14 it is evident that zeolites containing cations of calcium and strontium have a better performance than the other zeolites of the invention—compare examples 1-12 to example 13 in particular.

The zeolites of the Examples 6-14 were prepared by an ion exchange procedure. It may be expected that some of these zeolites may still contain, in addition to the specified cation, a portion of the cation of the displaced element which portion is not or not easily exchangeable. Nevertheless, these zeolites show substantial stabilizing activity in the copolymers of the invention.

EXAMPLES 18-19

Samples of a terpolymer of ethene, propene and carbon monoxide in the form of a powder having a bulk density of 440 g/l, and LVN of 1.75 dl/g (measured in m-cresol at 60° C.) and a crystalline melting point of 220° C. and containing 0.5% wt of 1,3,5-tris(3,5-di-t.butyl-4-hydroxyphenylmethyl)-2,4,6-trimethylbenzene (a commercially available antioxidant) and 0.5% wt of a copolymer of ethene and methacrylic acid (10% wt), were blended at two different concentration levels with samples of a commercially available zeolite A containing calcium cations (average particle size about 2 μm). The blends were extruded in a double-screw extruder having two devolatilisation openings (one in the vicinity of the feed supply opening and one in the vicinity of the die) and equipped with self-wiping 30 D screws. The extruder was operated at a feed rate of 12 kg/hour, a screw speed of 200 rpm, a barrel temperature setting of 250° C. and a die temperature setting of 230° C. The resultant mass temperature was 260° C. to 280° C. In one experiment water was supplied under pressure through the devolatilisation opening in the vicinity of the feed supply opening (about 2% wt calculated on the weight of the copolymer), while vacuum (about 10 mbar) was applied at the devolatilisation opening in the vicinity of the die. The strand was cooled in a bath containing demineralised water and cut into nibs. The nibs obtained from the extrusion were used in melt index measurements at a barrel temperature of 240° C. and using a load of 2.16 kg. The melt indices (MI) measured form a straight line when plotted as log(MI) vs. the residence time of the copolymer in the barrel of the melt index tester. The slope and the melt index at 5 minutes residence time (MI(5)) are presented in Table 2. The amounts of methanol present in the polymer before and after the extrusion were determined by extracting samples of the polymers with water at 120° C. during 16 hours and analysing the extracts by gas chromatography. The results are given in Table 3.

EXAMPLE 20 AND 21

The procedures of Examples 18 and 19 were substantially repeated with the difference that the addition of a zeolite to the polymer granulate was omitted. The result is presented in Table 3.

TABLE 3

| Example | Zeolite[a] Cation/Type | Molar ratio Si/Al | Steam/ Vacuum applied | Methanol content[b] | MI curve Slope l/min | MI(5) 10 g/min |
|---|---|---|---|---|---|---|
| 18 | $Ca^{2+}$/A (0.1) | 2 | Yes | 0.16 | −0.014 | 2.94 |
| 19 | $Ca^{2+}$/A (0.2) | 2 | No | 0.10 | −0.018 | 3.77 |
| 20 | — | — | Yes | 0.25 | −0.044 | 1.29 |
| 21 | — | — | No | 0.28 | −0.038 | 1.66 |

[a]Amount of zeolite used.
[b]Methanol content before extrusion: 0.31% wt.

When the copolymer is subjected to melt index measurements according to Examples 18-21 a low (negative) value of the slope of the log(MI) vs. residence time curve and a high value of the melt index at 5 minutes residence time, i.e. MI(5), are indicative of a relatively high melt stability.

By comparing the results of Examples 18 and 19 to Examples 20 and 21, it is observed that the addition of the inventive zeolite (containing a $Ca^{2+}$) to the copolymer, results in an improvement in the melt stability of the copolymer.

The copolymer which was used in Examples 18-21 was prepared in the presence of methanol as the reaction diluent of which a residual amount was still present in the copolymer after its purification. From the results of these examples it can be seen that an additional benefit of the presence of a zeolite in the copolymer during melt processing is a substantial reduction of the amount of residual methanol present in the copolymer. It can also be seen that the effect of the zeolite is much larger than the effect of the melt processing alone and the effects of the application of water (steam) and vacuum during melt processing.

While this invention has been described in detail for the purpose of illustration, it is not to be construed as limited thereby but is intended to cover all changes and modifications within the spirit and scope thereof.

That which is claimed:

1. A copolymer composition comprising a major amount of an alternating copolymer of carbon monoxide with one or more olefinically unsaturated compounds and a minor amount of at least one stabilizing additive which is a zeolite-type trivalent-metal silicate compound containing a cation of an element of Group 2 of the Periodic Table of elements.

2. A composition as in claim 1, wherein the zeolite-type trivalent-metal silicate compound is present in an amount of up to 20% wt based on the weight of the composition.

3. A composition as in claim 1, wherein the zeolite-type trivalent-metal silicate compound is present in an amount of from 0.001 to 10% wt based on the weight of the composition.

4. A composition as in claim 1, wherein the zeolite-type trivalent-metal silicate compound is present in an amount of from 0.005 to 5% wt based on the weight of the composition.

5. A composition as in claim 1, wherein the trivalent metal of the zeolite compound comprises at least one metal selected from the group consisting of aluminium, iron, gallium and boron.

6. A composition as in claim 5, wherein the trivalent metal is aluminium.

7. A composition as in claim 1, wherein the zeolite-type trivalent-metal silicate is a zeolite A or a faujasite type zeolite.

8. A composition as in claim 7, wherein the faujasite type zeolite is zeolite X.

9. A composition as in claim 1, wherein the element of Group 2 of the Periodic Table is an element of Group 2A.

10. A composition in claim 9, wherein the element of Group 2A of the Periodic Table is calcium or strontium.

11. A composition as in claim 9, wherein the cation of the element of Group 2 is present in an amount of from 0.1 to 0.5 gram atom per gram atom of the trivalent metal.

12. A composition as in claim 9, wherein the cation of the element of Group 2 is present in an amount of from 0.25 to 0.5 gram atom per gram atom of the trivalent metal.

13. A composition as in claim 1, wherein the zeolite-type trivalent-metal silicate has a silicon/trivalent-metal molar ratio of from 1 to 10.

14. A composition as in claim 13, wherein the cation of the element of Group 2 is present in an amount of from 1 to 5 gram atom per gram atom of the trivalent metal.

15. A composition as in claim 1, wherein the maximum particle size of the zeolite-type trivalent-metal silicate compound is 100 μm.

16. A composition as in claim 15, wherein particle size of the zeolite-type trivalent-metal silicate is from about 0.05 μm to about 10 μm.

17. A composition as in claim 1 further comprising one or more additional additives selected from the group consisting of sterically hindered phenolic compounds, aromatic amines, hydroxybenzophenones, hydroxyphenylbenzotriazoles, aluminium hydroxides, carboxylic esters of glycerol, acid amides of monocarboxylic acids, glycidyl ethers, and copolymers of ethene and acrylic acid or methacrylic acid.

18. A process for improving the heat stability of copolymers of carbon monoxide with one or more olefinically unsaturated compounds comprising the addition thereto of a minor amount of at least one stabilizing additive which is a zeolite-type trivalent-metal silicate compound containing a cation of an element of Group 2 of the Periodic Table.

19. A process as in claim 15, wherein the amount of residual solvent in the copolymer is substantially reduced.

20. A shaped article of manufacture made from the composition of claim 1.

* * * * *